(12) United States Patent
Chen et al.

(10) Patent No.: US 9,748,995 B2
(45) Date of Patent: Aug. 29, 2017

(54) SENSOR ASSEMBLY

(71) Applicant: HEWLETT-PACKARD DEVELOPMENT COMPANY, L.P., Houston, TX (US)

(72) Inventors: Chun Chih Chen, Taipei (TW); Hung-Wen Cheng, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/303,549

(22) PCT Filed: Apr. 30, 2014

(86) PCT No.: PCT/US2014/036100
§ 371 (c)(1),
(2) Date: Oct. 12, 2016

(87) PCT Pub. No.: WO2015/167514
PCT Pub. Date: Nov. 5, 2015

(65) Prior Publication Data
US 2017/0041035 A1  Feb. 9, 2017

(51) Int. Cl.
H04B 1/3827    (2015.01)
G01D 5/24      (2006.01)
H04M 1/02      (2006.01)
H04W 52/28     (2009.01)

(52) U.S. Cl.
CPC ............. *H04B 1/3838* (2013.01); *G01D 5/24* (2013.01); *H04M 1/026* (2013.01); *H04M 1/0264* (2013.01); *H04W 52/283* (2013.01); *H04M 2250/12* (2013.01)

(58) Field of Classification Search
CPC ..... H04B 1/3838; H04W 52/04–52/60; H04M 1/026; H04M 1/0264; H04M 2250/12; G01D 5/24
USPC ...................... 455/522, 574, 575.5
See application file for complete search history.

(56) References Cited

U.S. PATENT DOCUMENTS

| | | |
|---|---|---|
| 2001/0011894 A1 | 8/2001 | Havey et al. |
| 2011/0006789 A1 | 1/2011 | Cooper et al. |
| 2011/0312349 A1 | 12/2011 | Forutanpour et al. |
| 2012/0044115 A1 | 2/2012 | McCaughey et al. |
| 2012/0194393 A1 | 8/2012 | Uttermann et al. |
| 2012/0223865 A1 | 9/2012 | Li et al. |
| 2012/0306770 A1* | 12/2012 | Moore ...................... G06F 3/01 345/173 |
| 2013/0095897 A1 | 4/2013 | Edeler |
| 2014/0111684 A1 | 4/2014 | Corbin et al. |
| 2014/0267874 A1* | 9/2014 | Ratcliff .............. H04N 5/23245 348/335 |

(Continued)

OTHER PUBLICATIONS

STMicroelectronics, "More connected, more secured, more immersive ST's solutions for mobile devices", <http://www.st.com/web/en/resource/sales_and_marketing/promotional_material/brochure/brmobile.pdf >, Feb. 2012.

*Primary Examiner* — Raymond Dean
(74) *Attorney, Agent, or Firm* — HP Patent Department

(57) ABSTRACT

A sensor assembly is provided for a portable electronic device. The sensor assembly includes a proximity sensor and a module including shielding. The proximity sensor is connected to the shielding such that the shielding selectively functions as a sensor electrode for the proximity sensor.

13 Claims, 2 Drawing Sheets

(56) References Cited

U.S. PATENT DOCUMENTS

2015/0215501 A1\* 7/2015 Cho .................... H04N 5/2252
348/374

\* cited by examiner

SENSOR ASSEMBLY

BACKGROUND

Portable consumer electronic devices such as mobile telephones, tablets and portable (e.g. laptop or palm) computers generally use sensor assemblies to detect the presence of a user in proximity to the device.

However, sensor assemblies take up internal space in the devices and may also interfere with antenna gain performance. Accordingly as consumer electronic devices are continually changing in size and internal component configuration a market has developed for more compact devices, in particular, thinner and lighter devices.

BRIEF DESCRIPTION OF DRAWINGS

The disclosure is described by way of non-limiting examples with reference to the accompanying drawings, in which.

DETAILED DESCRIPTION

Figure 1:
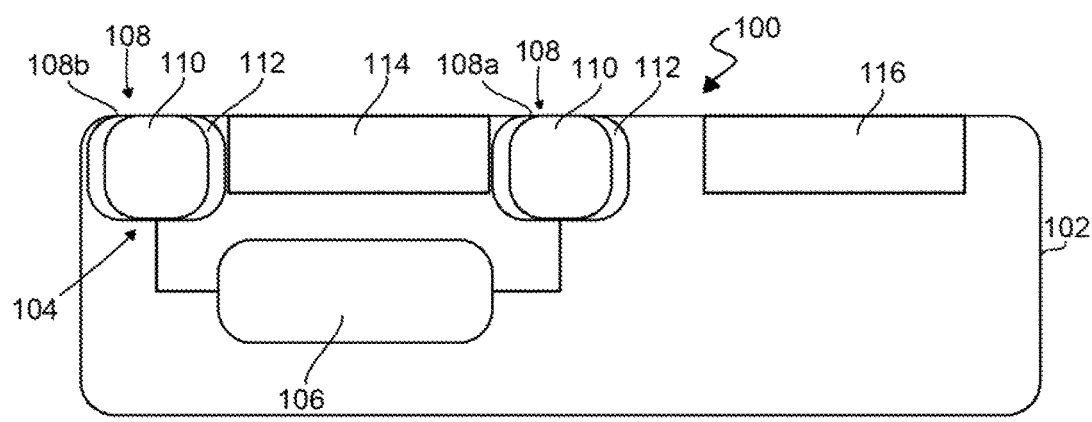
FIG. 1 shows a schematic, cross-sectional view of a portable consumer electronic device including an example of a sensor assembly.

One aspect of the disclosure relates to a sensor assembly for a consumer device. The sensor assembly comprises a proximity sensor and a module, the module includes shielding. The proximity sensor is connected to the shielding such that the shielding selectively functions as a sensor electrode of the proximity sensor.

Another aspect of the disclosure relates to a sensor assembly for sensing proximity of a user relative to a portable consumer electronic device. The device includes a module and the sensor assembly includes a proximity sensor connected to a component of the module. The component of the module selectively functions as a sensor electrode for the proximity sensor. The circuitry is associated with the proximity sensor and the component to govern when the component functions as the sensor electrode.

Yet another aspect of the disclosure relates to a method of operating a consumer device. The method includes selectively configuring a component of a module of the device to function as a sensor electrode of a proximity sensor of the device and sensing the presence of a user in proximity to the device via the proximity sensor.

In this specification, unless the context clearly indicates otherwise, the term "portable consumer electronic device" or "portable electronic device" is to be understood as including any portable device used by consumers which receives and/or transmits signals and includes wireless devices, mobile phones, tablets, portable computers such as notebooks and laptops, digital cameras with data transmission capabilities, so-called "smart" watches, or the like.

Government regulations, such as those promulgated by the Federal Communications Commission (FCC) of the United States of America, limit the allowable amount of radiation energy that is absorbed by a user when using a portable consumer electronic device. This radiation energy is referred to as a "specific absorption rate" (SAR). As a result of this limitation, the device is configured to limit the amount of output power and, accordingly, the radiation energy which is output. This often results in a loss in quality of service, such as connection drop-outs, low data transmission and reception rates, poor reception, or the like.

However, the device is not always used close to the user's body and, in particular the users head. Instead, modern devices are often used while being held away from the user and/or in a "hands free" mode. Since the absorption of radiation by the user's body decreases drastically over distance, where the device is used while being held away from the users body, the output power could be increased while still keeping the absorbed energy below the mandated SAR limits. This improves the quality of service and, consequently, enhances the user experience.

In order to control the output power of the device, the device has a proximity sensor that senses whether or not the user is in proximity to the device. Typically the proximity sensor of the device is configured to sense when a part of the user's body, such as the user's head or ear, is within a range of about 10 mm to about 20 mm of the device.

An example of a sensor type for use as a proximity sensor is a capacitive sensor which measures a change in capacitance between two electrodes. This capacitance depends on the permittivity $\epsilon$ of the material within the electric field created by a voltage between the electrodes. Since the electric field is not restricted to the inside of the device but extends to the outside, the presence of an external object changes the permittivity $\epsilon$ and therefore the capacitance. The sensor detects the change in capacitance to determine that an object is present.

By distinguishing between different magnitudes of change in the permittivity $\epsilon$, the proximity sensor is able to distinguish between human tissue and other materials such as, for example, plastics covers. The capacitive proximity sensor uses at least one sensing electrode. Integrating the sensing electrode into a casing of the device may be difficult as space within the casing of the device is often very restricted. This is especially so for more modern devices where there is a consumer preference for devices which are thinner and lighter.

FIG. 1 illustrates an example of a portable consumer electronic device 100 in the form of a tablet. The device 100 comprises a casing 102 housing operating circuitry (omitted from FIG. 1 for the sake of clarity). The device 100 includes a sensor assembly 104 comprising a proximity sensor 106 and a module 108 of the device 100. In this example, the module 108 of the device 100 is a camera module 108. The device includes two such camera modules 108, a forward facing camera module 108a and a rearward facing camera module 108b. Each camera module 108 includes a camera 110 and camera shielding 112. While the example refers to the module being a camera module, it will be appreciated that any other module of the device 100 which includes shielding and which is appropriately positioned in the device, e.g. microphones, speakers, could be used as the relevant module.

The camera shielding 112 is of a metal can-type surrounding components of the camera 110 on at least four sides and having a pair of opposed apertures. A lens of the camera 110 protrudes through a first of the apertures and connection components of the camera module 108 protrude through a second, opposed aperture for connecting the camera module 108 to a printed circuit board.

The camera shielding 112 is of tin or zinc plated steel, stainless steel, tin-plated aluminum, brass, copper-beryllium alloy, nickel-silver alloy, other copper alloys, or the like.

As will be described in greater detail below, the proximity sensor 106 is connected to the shielding 112 of the camera modules 108 so that the shielding 112 operates as a sensor electrode for the proximity sensor 106. In the illustrated example, the proximity sensor 106 is therefore able to detect proximity of a user whether at a front or a rear of the device 100.

In one example, the proximity sensor 106 is a capacitive sensor model no STM8T143 by ST Microelectronics having its global headquarters in Geneva, Switzerland and its Americas headquarters at 750 Canyon Drive, Suite 300, Coppell, Tex., 75018, USA. In this example, the proximity sensor 106 uses a ProxSense™ charge transfer capacitive acquisition method by Azoteq, which allows the proximity sensor 106 to sense the proximity of a user using the camera shielding 112 as a single electrode.

In one example, the device 100 includes a main 3G/long term evolution (LTE) antenna 114 and an auxiliary 3G/LTE antenna 116. As illustrated in FIG. 1, the referenced parts, except the proximity sensor 106, are arrayed along a width (the "x" direction) of the casing 102 reducing the height of the casing 102. The sensor electrodes 112 for the proximity sensor 106 are arranged on opposed sides of the antenna 114 to detect left-to-right movement or right-to-left movement of a person's hand close to the antenna 114.

In the example illustrated in FIG. 1 of the drawings, the antenna 116 is a receiving antenna only. If it were used for transmission purposes as well, FCC regulations require that it too have sensor electrodes for the proximity sensor 106 associated with it with the sensor electrodes being arranged on opposed sides of the antenna 116.

In some devices, an antenna of the device is used as a proximity sensor. However, 3G/LTE antennas generally have strict performance specifications and are wide band (typically 700 MHz-2.3 GHz). As a result, introducing dual-use concepts into the 3G/LTE antennas 114, 116 of the device 100 may result in a more complex design of the antennas 114, 116. Thus, a separate proximity sensor 106 is provided and uses an existing component of the device 100, such as the camera shielding 112, as the sensor electrode. This, in turn, allows the output power of the 3G/LTE antenna 114, to be reduced to reduce the SAR value to a level below the regulatory limits established by governing bodies.

Figure 2:
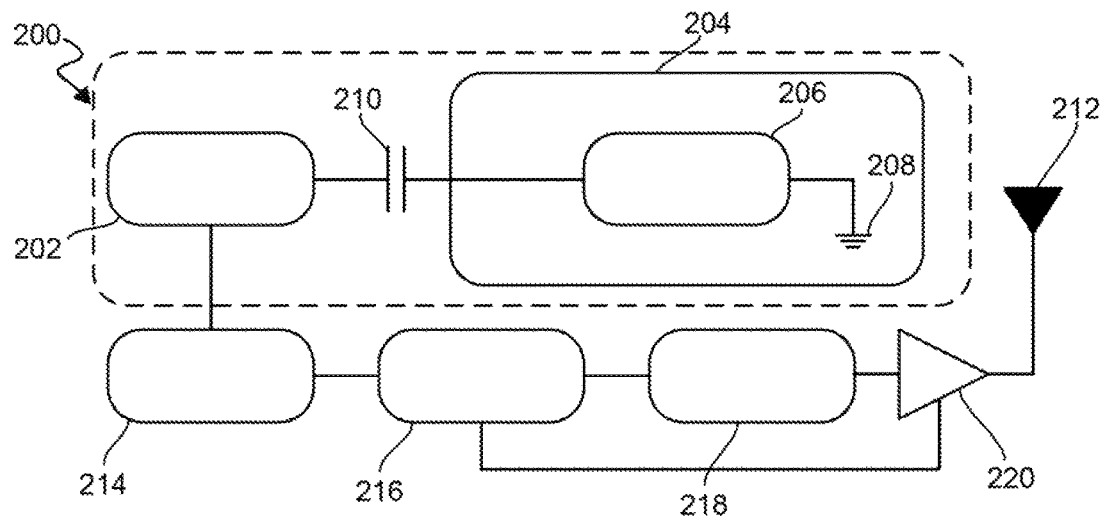
FIG. 2 shows a schematic block diagram of an example of a sensor assembly for a portable consumer electronic device.

FIG. 2 illustrates an example of a sensor assembly 200. The sensor assembly 200 includes a proximity sensor 202 connected to a module, more particularly, a camera module 204 of a portable consumer electronic device, the camera module 204 including camera shielding 206. More specifically, the proximity sensor 202 is connected to the camera shielding 206 of the camera module 204, the camera shielding 206 functioning as a sensor electrode for the proximity sensor 202. The shielding 206 is connected to a ground connection 208.

The shielding 206 and the proximity sensor 202 are interconnected by circuitry comprising a frequency dependent coupling element in the form of a capacitive element, or capacitor, 210. The capacitor 210 is arranged to block transmission of low frequency signals, in particular, a steady state signal such as a DC signal, between the proximity sensor 202 and the shielding 206 while ensuring use of the camera shielding 206 in its shielding application when the camera module 204 is active. In other words, the presence of the capacitor 210 permits dual use of the camera shielding 206 of the camera module 204.

As illustrated in FIG. 2, the camera shielding 206 is connected via the capacitor 210, the proximity sensor 202, a sensor hub 214, a base band module 216, a transmitter 218 and a power amplifier 220 to the antenna 212. The components 214, 216, 218 and 220 enable the proximity sensor 202 to cause the antenna 212 to reduce its emissions to a level below the required SAR level when the proximity sensor 202 senses the presence of a user of the device.

At least in some of the examples, the capacitor 210 has a capacitance in the range of 1 pF to 5 pF, more particularly, in the ranges of 1 pF to 2 pF, 2 pF to 3 pF, 3 pF to 4 pF and 4 pF to 5 pF, it being understood that each of these ranges includes the stated end values. As an example, the capacitor 210 has a capacitance of 4 pF.

In use, when the proximity sensor 202 senses the presence of a user within range of the device, typically within about 10 mm to about 20 mm of the device, the proximity sensor 202 causes the transmitter 218 to reduce its power output to reduce emissions from the antenna 212. Simultaneously, if the user has turned on the camera module 204, the camera shielding 206 operates as shielding for a camera (not shown) of the camera module 204. This inhibits electromagnetic interference (EMI) from the camera module 204 causing noise on the antenna 212 when the camera module 204 is enabled.

Figure 3:
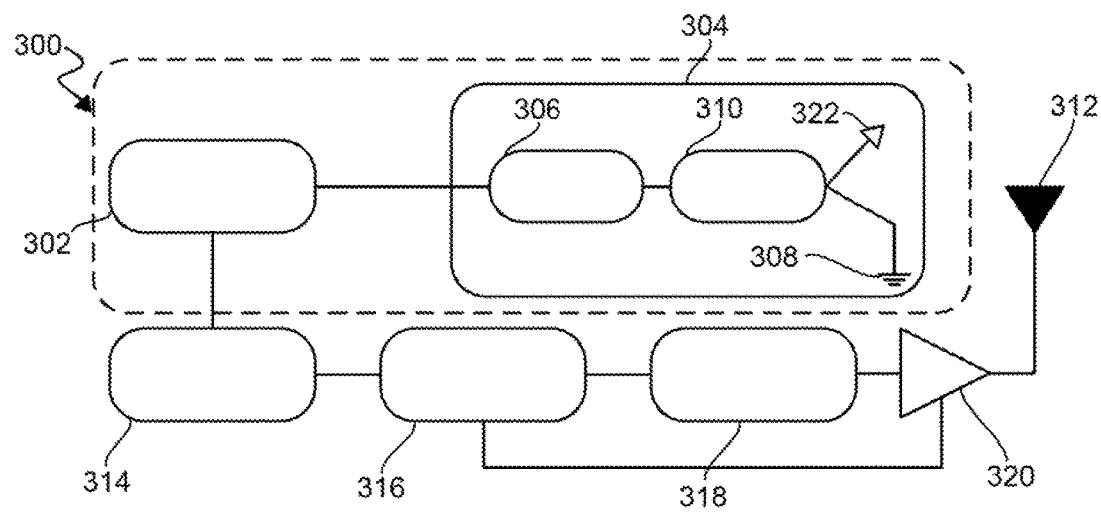
FIG. 3 shows a schematic block diagram of another example of a sensor assembly.

FIG. 3 illustrates another example of a sensor assembly 300 for a portable consumer electronic device. The sensor assembly 300 includes a proximity sensor 302 connected to a module, more particularly, a camera module 304 of a portable consumer electronic device, the camera module 304 including camera shielding 306. More specifically, the proximity sensor 302 is connected to the camera shielding 306 of the camera module 304, the camera shielding 306 functioning as a sensor electrode for the proximity sensor 302.

The camera shielding 306 of the camera module 304 is connected to a ground connection 308 via circuitry in the form of a switch, more particularly, an RF switch 310. The RF switch 310 controls the function of the camera shielding when the proximity sensor 302 senses the presence of a user in proximity to the device and, consequently, controls emissions from an antenna 312 of the device.

The RF switch 310 is any suitable configuration of RF switch and may be a solid state switch, an electro-mechanical switch, a microwave switch, or the like.

The proximity sensor 302 is connected via a sensor hub 314, a base band module 316, a transmitter 318 and a power amplifier 320 to the antenna 312.

The RF switch 310 is connected to switch between the ground connection 308 (a first, or "ground", state) and a second, or floating, state as illustrated at 322. The ground state 308 may be a virtual ground.

In use, when a camera (not shown) of the camera module 304 is inactive, the RF switch 310 is switched to the floating state 322 and the camera shielding 306 of the camera module 304 functions as the sensor electrode for the proximity sensor 302. As long as the proximity sensor 302 does not detect the presence of any part of the user's body within its operating range, the transmitter 318 functions at normal power and the antenna 312 is able to transmit/receive optimally. As soon as any part of the user's body comes into the range of the proximity sensor 302, the proximity sensor 302 causes the transmitter 318 to reduce its power output and, in so doing, reduce the emissions from the antenna 312.

Further, when the user turns on the camera of the camera module 304, the RF switch 310 switches from the floating state 322 to the ground state 308 and the camera shielding 306 adopts its conventional function as shielding to inhibit electromagnetic interference from the camera module 304 causing noise on the antenna 312 when the camera module 304 is enabled.

After the camera of the camera module 304 has been turned off, whether by the user or due to inactivity, the camera module 304 causes the transmitter 318, once again, to operate at its normal power output. The RF switch 310 switches to its floating state 322 again to cause the camera shielding 306 to function as the sensor electrode for the proximity sensor 302.

Figure 4A:
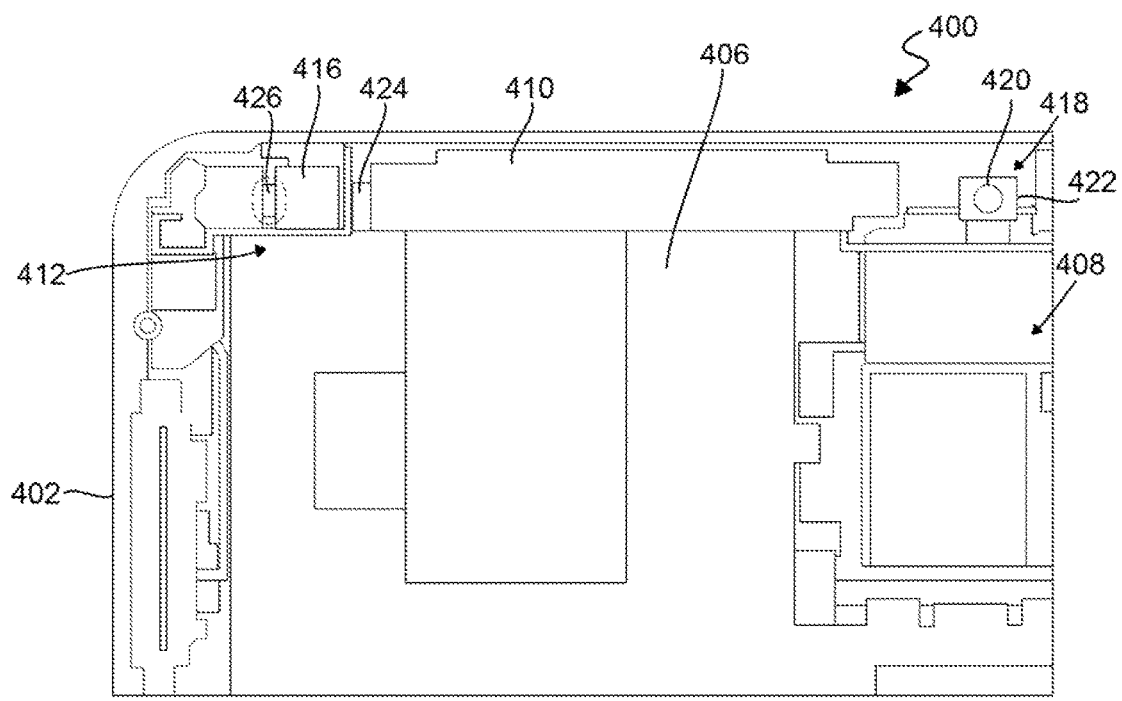
FIG. 4a shows a plan view of a part of an example of a portable consumer electronic device including an example of a sensor assembly.
Figure 4B:
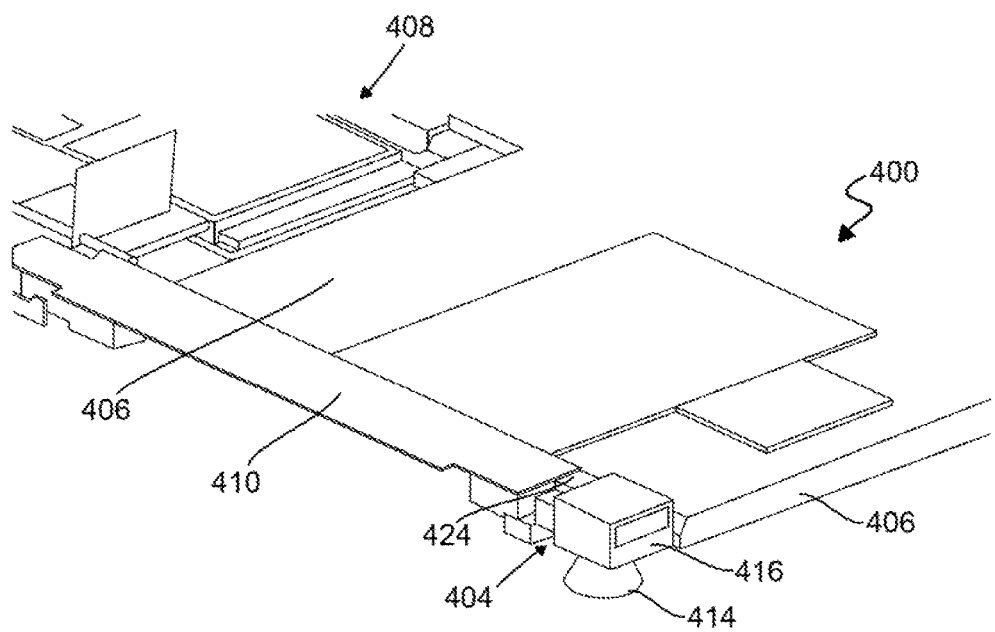
FIG. 4b shows a perspective view of the part of the portable consumer electronic device of FIG. 4a with a casing of the device omitted.

FIGS. 4a and 4b of the drawings illustrate part of a portable consumer electronic device 400 of the type described above with reference to FIG. 1 of the drawings. The illustrated device 400 is a tablet having a casing 402, a part of which is shown in FIG. 4a of the drawings and which is omitted altogether from FIG. 4b of the drawings to illustrate the arrangement of internal components of the device 400.

An example of a sensor assembly 404 is mounted on a printed circuit board (PCB) 406 of the device 400. The PCB 406 carries operating circuitry 408 of the device 400. Further, a pair of 3G/LTE antennas 410, only one of which is shown in FIGS. 4a and 4b of the drawings, is arranged on the PCB 406. A first camera module 412, having a rearward facing camera 414 (FIG. 4b) and camera shielding 416, and a second camera module 418, having a forward facing camera 420 and camera shielding 422, are also carried by the PCB 406. As described above and as illustrated in FIG. 4a of the drawings, the camera modules 412 and 418 are arranged on opposed sides of the antenna 410.

The sensor assembly 404 includes a proximity sensor 424 connected to the two camera modules 412 and 418, more particularly, to the camera shielding 416 and 422 of the modules 412 and 418, respectively. As described above, the camera shielding 416, 422 functions either as shielding for its associated camera 414, 420, respectively, or as a sensor electrode for the proximity sensor 424.

The proximity sensor 424 is connected to the camera shielding 416, 422 via circuitry 426. In one example, the circuitry 426 is in the form of a frequency dependent coupling element in the form of a capacitive element, or capacitor. In another example, the circuitry 426 is in the form of an RE switch. The RF switch is switchable between a first, ground state, in which the shielding 416, 422 of the camera modules 412, 418 functions as an EMI shield for its associated camera 414, 420 and a second, floating state in which the shielding 416, 422 functions as a sensor electrode for the proximity sensor 424.

It is to be noted that, in the illustrated example, the components are arrayed alongside each other reducing the height of the casing 402 of the device 400. The dual use to which the camera shielding 416, 422 is put and the absence of a dedicated sensor electrode for the proximity sensor 424 also reduces the number of components in the casing 402 contributing to a smaller, lighter device 400. Still further, in the example illustrated in FIGS. 4a and 4b, the provision of the proximity sensor alongside the antenna 410 rather than beneath the antenna improves the sensitivity of the proximity sensor.

Numerous variations and/or modifications may be made to the above-described examples, without departing from the broad general scope of the present disclosure. The present examples are, therefore, to be considered in all respects as illustrative and not restrictive.

The invention claimed is:

1. A sensor assembly, comprising:
   a proximity sensor; and
   a module including shielding, wherein the module is a camera module and the shielding is camera shielding, wherein the proximity sensor is connected to the shielding such that the shielding selectively functions as a sensor electrode of the proximity sensor.

2. The sensor assembly of claim 1, wherein the proximity sensor is connected to the shielding via a frequency dependent coupling element.

3. The sensor assembly of claim 2, wherein the frequency dependent coupling element comprises a capacitive element.

4. The sensor assembly of claim 1, wherein a switch is connected to the shielding, and wherein the switch is switchable between a first state and a second state.

5. The sensor assembly of claim 4, wherein the switch is switched to the first state on receipt of an input signal from the module and is switched to the second state on receipt of an input signal from the proximity sensor.

6. A sensor assembly for sensing proximity of a user relative to a portable consumer electronic device including a module, the sensor assembly comprising:
   a proximity sensor connected to a component of the module, wherein the module is a camera module and the component comprises camera shielding, the component selectively functioning as a sensor electrode for the proximity sensor; and
   circuitry associated with the proximity sensor and the component to govern when component functions as the sensor electrode.

7. The sensor assembly of claim 6, wherein the circuitry comprises a switch associated with the module, the switch being switchable between a first state and a second state.

8. The sensor assembly of claim 7, wherein the switch is in the first state when the module is operative and the switch is switched to the second state when the module is inoperative.

9. The sensor assembly of claim 6, wherein the circuitry comprises a frequency dependent coupling element interconnecting the proximity sensor and the component.

10. The sensor assembly of claim 9, wherein the frequency dependent coupling element comprises a capacitive element.

11. A method of operating a portable electronic device, the method comprising:
    selectively configuring a component of a module wherein the component comprises camera shielding, of the portable electronic device to function as a sensor electrode of a proximity sensor of the portable electronic device; and
    sensing the presence of a user in proximity to the device via the proximity sensor.

12. The method of claim 11, further comprising selectively blocking transmission of a low frequency signal between the module and the proximity sensor.

13. The method of claim 11, wherein the portable electronic device includes a switch, and the method further comprises receiving a signal at the switch from one of the proximity sensor or the module to alter the function of the component.

* * * * *

UNITED STATES PATENT AND TRADEMARK OFFICE
CERTIFICATE OF CORRECTION

| | | Page 1 of 1 |
|---|---|---|
| PATENT NO. | : 9,748,995 B2 | |
| APPLICATION NO. | : 15/303549 | |
| DATED | : August 29, 2017 | |
| INVENTOR(S) | : Chun Chih Chen et al. | |

It is certified that error appears in the above-identified patent and that said Letters Patent is hereby corrected as shown below:

In the Claims

In Column 6, Line 32 approx., in Claim 6, delete "when component" and insert -- when the component --, therefor.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*